US008776156B2

(12) United States Patent
Ohmori et al.

(10) Patent No.: US 8,776,156 B2
(45) Date of Patent: Jul. 8, 2014

(54) CONTENT RECEIVING APPARATUS, DATA PROCESSING APPARATUS, CONTENT RECEPTION METHOD

(75) Inventors: Yoshihiro Ohmori, Oume (JP); Masaaki Kikuchi, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/300,324

(22) Filed: Nov. 18, 2011

(65) Prior Publication Data
US 2012/0240175 A1 Sep. 20, 2012

(30) Foreign Application Priority Data

Mar. 16, 2011 (JP) ................................. 2011-058321

(51) Int. Cl.
H04N 7/173 (2011.01)
H04N 21/235 (2011.01)
(52) U.S. Cl.
CPC ................................ *H04N 21/2358* (2013.01)
USPC ........................................................ 725/112
(58) Field of Classification Search
CPC .......... H04N 21/4356; H04N 21/2358; H04N 21/858
USPC ........................................................ 725/112
See application file for complete search history.

(56) References Cited

U.S. PATENT DOCUMENTS

| 7,277,947 | B1* | 10/2007 | Van De Sluis et al. ....... 709/227 |
| 2001/0055951 | A1* | 12/2001 | Slotznick ......................... 455/41 |
| 2002/0089610 | A1 | 7/2002 | Ohno et al. |
| 2005/0138137 | A1* | 6/2005 | Encarnacion et al. ........ 709/217 |
| 2005/0213935 | A1 | 9/2005 | Shibata et al. |
| 2006/0153198 | A1* | 7/2006 | Chadha ....................... 370/395.2 |
| 2007/0053514 | A1* | 3/2007 | Imai et al. ...................... 380/204 |
| 2007/0054627 | A1* | 3/2007 | Wormald ......................... 455/70 |
| 2007/0061725 | A1* | 3/2007 | Isaac et al. ..................... 715/717 |
| 2007/0179979 | A1 | 8/2007 | Folgner et al. |
| 2007/0291694 | A1* | 12/2007 | Zhang .......................... 370/331 |
| 2008/0034095 | A1* | 2/2008 | Richardson et al. .......... 709/227 |
| 2008/0134256 | A1* | 6/2008 | DaCosta ......................... 725/62 |
| 2010/0194980 | A1* | 8/2010 | Balasubramanian et al. 348/552 |

FOREIGN PATENT DOCUMENTS

| JP | 11-338791 | 12/1999 |
| JP | 2002-199301 | 7/2002 |
| JP | 2004-304309 | 10/2004 |
| JP | 2004-312233 | 11/2004 |
| JP | 2006-127220 | 5/2006 |
| JP | 2008-271197 | 11/2008 |
| JP | 2009-055099 | 3/2009 |
| JP | 2009-524294 | 6/2009 |

OTHER PUBLICATIONS

Japanese Patent Application No. 2011-058321; Notice of Reasons for Rejection; Mailed Feb. 21, 2012 (English translation).

* cited by examiner

*Primary Examiner* — Junior Mendoza
(74) *Attorney, Agent, or Firm* — Blakely, Sokoloff, Taylor & Zafman LLP

(57) ABSTRACT

According to one exemplary embodiment, a content receiving apparatus includes: a first receiver which receives a first identifier of first content from a first external apparatus; a generator which employs the first identifier to generate a second identifier of second content that corresponds to the first content but has different quality from the first content; a transmitter which transmits a content request including the second identifier to a second external apparatus different from the first external apparatus; and a second receiver which receives data of the second content transmitted from the second external apparatus in response to the content request.

7 Claims, 9 Drawing Sheets

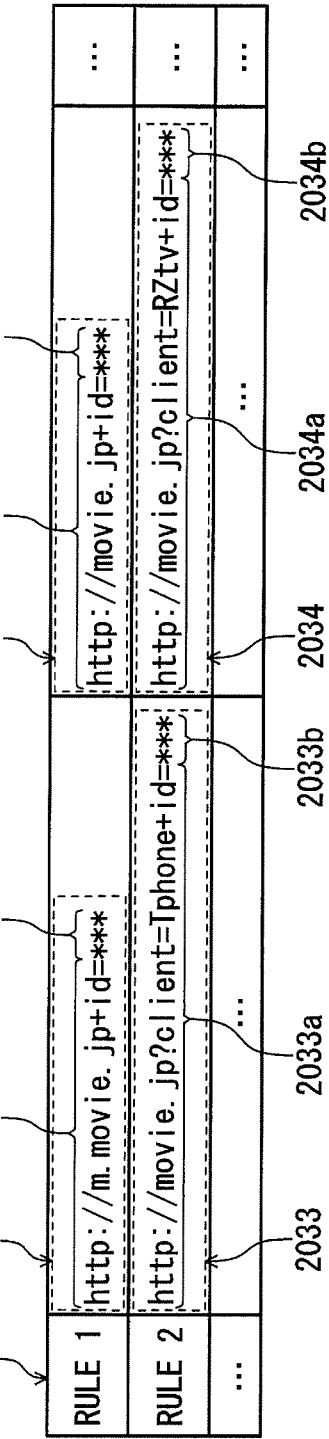

CONTENT RECEIVING APPARATUS, DATA PROCESSING APPARATUS, CONTENT RECEPTION METHOD

CROSS REFERENCE TO RELATED APPLICATION(S)

The application is based upon and claims the benefit of priority from Japanese Patent Application No. 2011-058321 filed on Mar. 16, 2011; the entire content of which are incorporated herein by reference.

FIELD

Exemplary embodiments described herein relate generally to a content receiving apparatus, a data processing apparatus and a content reception method.

BACKGROUND

Technology exists for acquiring content from a server connected to a network, such the Internet. Desired content is received from a server by transmitting a content request containing an address of the server and an identifier of the desired content.

When content displayed or searched for using a mobile terminal for example can then be displayed as a video of the contents using a display apparatus having a larger display screen than the display screen of the mobile terminal, then the content can be viewed by many people at the same time. As methods to achieve such a technology, there are methods in which content is transmitted from the mobile terminal to the display apparatus, and methods in which the address of the server and the content identifier are sent from the mobile terminal to the display apparatus and the display apparatus then receives the content.

BRIEF DESCRIPTION OF THE DRAWINGS

Exemplary embodiments of the present invention will be described in detail based on the following figures, wherein:

FIGS. 3A and 3B are diagrams showing an example of data configuration in a device database and a modification rule database according to the first exemplary embodiment;

DETAILED DESCRIPTION OF THE EXEMPLARY EMBODIMENTS

In general, according to one exemplary embodiment, a content receiving apparatus includes: a first receiver which receives a first identifier of first content from a first external apparatus; a generator which employs the first identifier to generate a second identifier of second content that corresponds to the first content but has different quality from the first content; a transmitter which transmits a content request including the second identifier to a second external apparatus different from the first external apparatus; and a second receiver which receives data of the second content transmitted from the second external apparatus in response to the content request.

Explanation follows regarding exemplary embodiments with reference to the drawings.

First Exemplary Embodiment

Figure 1:
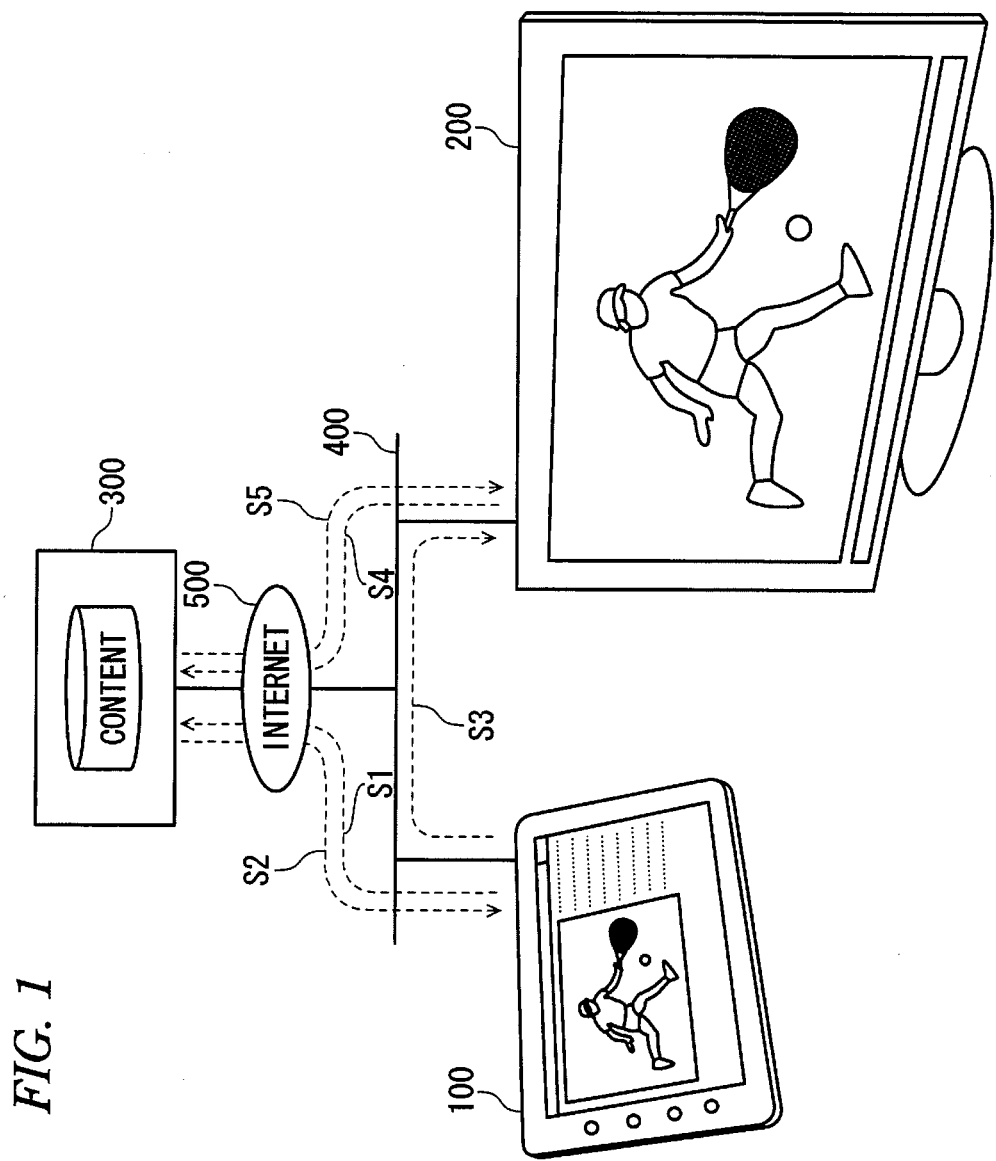
FIG. 1 is a diagram showing an example of a mode of use of a mobile terminal and a display apparatus according to a first exemplary embodiment.

FIG. 1 is a diagram showing an example of a mode of use of a data processing system according to a first exemplary embodiment. The data processing system includes a mobile terminal 100, a display apparatus 200, a server apparatus 300, a home network 400 and the Internet 500. The mobile terminal 100 is connected to the display apparatus 200 by the home network 400, which either a wired or wireless network. The mobile terminal 100 and the display apparatus 200 are connected to the server apparatus 300 through the Internet 500. The server apparatus 300 provides, for example, a Video On Demand (VOD) service or stores video content posted on the Internet for use in a video hosting service. Content data of plural different qualities (such as video resolution, audio bitrate, amount of text) are stored on the server apparatus 300 corresponding to each content.

In order to receive and display desired content, the mobile terminal 100 first accesses a Web page showing a page of video for distribution by the server apparatus 300 and receives identifiers of video content that can be received from the Web page. The mobile terminal 100 selects desired content from among the received video content identifiers, and transmits a content request including the selected content identifier to the server apparatus 300 (S1 shown in FIG. 1). The content identifiers, for example, are included in configuration data of the video distribution page received from the server apparatus 300. The mobile terminal 100 then receives the video content transmitted from the server apparatus 300 in response to the request (S2).

The mobile terminal 100 transmits the identifier of the desired content to the display apparatus 200 (S3). The display apparatus 200 transmits a content request including the received identifier to the server apparatus 300 (S4), and receives the content data transmitted from the server apparatus 300 in response to the request (S5).

Configuration may be made such that, when accessing the video distribution page to the server apparatus 300, the mobile terminal 100 transmits to the server apparatus 300 information regarding the browser software employed by the mobile terminal 100. The server apparatus 300 then transmits content matching the input browser software data (called "redirect"). The mobile terminal 100 then receives the configuration data for the redirected Web page.

Namely, when the server apparatus 300 has a redirect function, the identifier of the video content matching the browser software employed by the mobile terminal 100 is input to the mobile terminal 100. Consequently, a concern arises that if the display apparatus 200 was to use the identifier transmitted from the mobile terminal 100 unaltered to receive video content then video content that was not compatible with the display apparatus 200 might be received. In other words, when the mobile terminal 100 is viewing a page after having been redirected to a mobile Web page stored on the server apparatus 300, sometimes the mobile terminal 100 would receive the identifier of video content for mobiles acquirable from the Web page for mobile devices. However, when the mobile version of the Web page and contents for mobile devices is accessed from the display apparatus 200, since the server apparatus 300 is unable to determine whether or not the user is intentionally trying to access the mobile version of the Web page and mobile video content, sometimes no redirection is given to the address of normal video content with higher image resolution than mobile video content.

The display apparatus 200 according to the first exemplary embodiment is capable of employing the content identifier transmitted from the mobile terminal 100, and acquiring content data matched to the own device from out of plural types of content data corresponding to contents of different qualities (such as with respect to video resolution, audio bitrate, amount of text) stored on the server apparatus 300.

Figure 2:
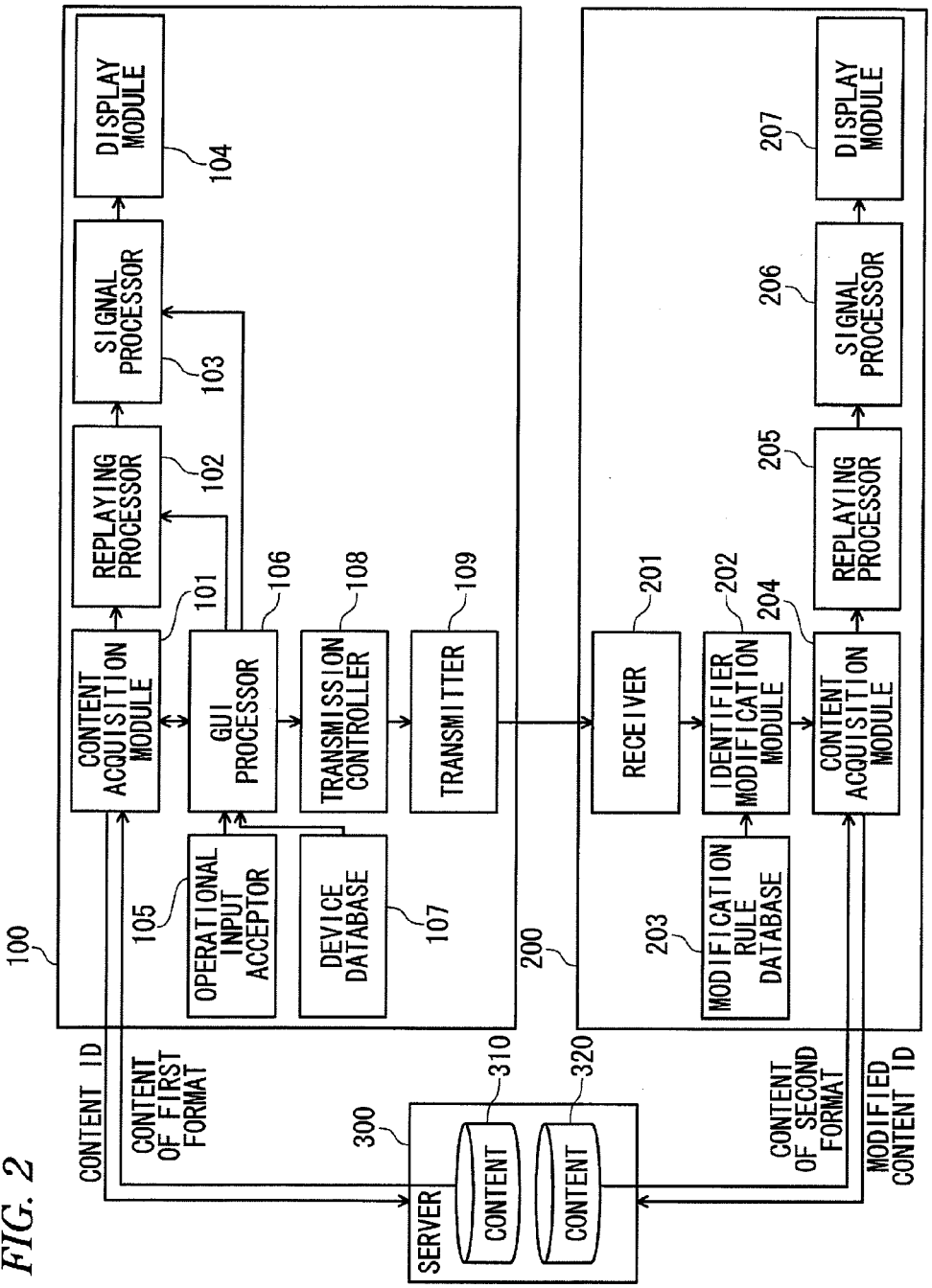
FIG. 2 is functional block diagram showing an example of the mobile terminal and the display apparatus according to the first exemplary embodiment.

FIG. 2 is functional block diagram showing an example of the mobile terminal 100, the display apparatus 200 and the server apparatus 300.

The mobile terminal 100 includes a content acquisition module 101, a replaying processor 102, a signal processor 103, a display module 104, an operational input acceptor 105, a GUI processor 106, a device database 107, a transmission controller 108 and a transmitter 109.

The content acquisition module 101 receives content data in response to an instruction from the GUI processor 106. By transmitting a data request identifying the URI of the Web page for video content distribution, the content acquisition module 101 receives Web page data transmitted from the server apparatus 300 in response to the data request. The Web page data includes data (such as content name, content identifier) of content that can be received from the Web page. The content acquisition module 101 outputs the Web page data to the GUI processor 106.

When input with the identifier of the video contents from the GUI processor 106 (address data such as URI), the content acquisition module 101 receives video content data stored on the server apparatus 300 by transmitting a request including the identifier to the server apparatus 300. The content acquisition module 101 then outputs the received video content data to the replaying processor 102.

The replaying processor 102 generates (decodes) the video content data input from the content acquisition module 101 according to the instruction from the GUI processor 106. The replaying processor 102 then outputs the generated data to the signal processor 103.

The video data decoded by the replaying processor 102 and the screen data generated by the GUI processor 106 are input to the signal processor 103. The signal processor 103 then converts the input data into a video signal of a format displayable on the display module 104, and outputs the video signal to the display module 104. When the video data from the replaying processor 102 and the generated screen data, described later, from the GUI processor 106 are input to the signal processor 103, this data is superimposed so as to be overlaid on the video currently being screened and converted into a video signal.

The display module 104 displays a video using the video signal input from the signal processor 103.

The operational input acceptor 105 accepts external operational input to the mobile terminal 100. The operational input acceptor 105 is, for example, mechanical buttons (not shown in the drawings) provided to the mobile terminal 100, or a touchscreen (not shown in the drawings) provided on the display module 104. The operational input acceptor 105 accepts operational input corresponding to the screen being displayed on the display module 104, and outputs the operational input to the GUI processor 106.

The GUI processor 106 generates a screen (image) for displaying on the display module 104, and performs processing on the operational input accepted by the operational input acceptor 105 for the screen displayed on the display module 104. The GUI processor 106 generates, for example, various screens like those of FIGS. 4A to 4D, described later, and outputs screen data to the signal processor 103. The GUI processor 106 then executes processing according to the operational inputs to the screen.

For example, the GUI processor 106 generates screen data of a content selection screen for selecting video content, screen data for a replaying screen of video content, screen data of a device selection screen for selecting an external device for replaying video content, and screen data for an operation screen for an external device.

The screen data of the content selection screen is, for example, generated using configuration data of a Web page received from the server apparatus 300. This configuration data includes such data items as identifiers (address data such as URI), tile, and content description of video content acquirable from the Web page. The Web page configuration data may, for example, be received by accessing the Web page using browser software.

When the operational input acceptor 105 accepts a content replaying request operational input to a content selection screen displayed on the display module 104, the GUI processor 106 outputs to the content acquisition module 101 the identifier (URI) of the video content indicated in the content replaying request operational input. The GUI processor 106 then generates screen data for a replaying screen and outputs the screen data to the signal processor 103.

When the operational input acceptor 105 accepts another-device replaying request operational input to a content selection screen or a replaying screen displayed on the display module 104, the GUI processor 106 generates data for a device selection screen based on device data stored in the device database 107, and outputs the generated data to the signal processor 103. When input with a device selection operational input to the device selection screen, the GUI processor 106 outputs to the transmission controller 108 the identifier (such as the IP address) of the device indicated by the operational input and the identifier (URI) of the content indicated in the replaying request operational input.

When input with a device identifier and content identifier from the GUI processor 106, the transmission controller 108 generates a replaying command including the content identifier and transmits the command using the transmitter 109 to the device indicated by the device identifier.

Explanation follows regarding an example of functional blocks of the display apparatus 200.

A receiver 201 receives a content identifier transmitted from the mobile terminal 100, and outputs the identifier to an identifier modification module 202. The identifier modification module 202 modifies the input content identifier according to modification rules stored in a modification rule database 203. The server apparatus 300 is stored with data of video content of plural different qualities (with respect to at least one of factors such as video resolution, audio bitrate and amount of text) for video content corresponding to each video content item. A different identifier (address data such as URI) is allocated to each of the plural items of mutually corresponding content according to a specific modification rule. Data for the specific modification rules are stored in the modification rule database 203. Namely, the identifier modification module 202 generates identifiers (such as URIs) of different quality video content, corresponding to the content of the video content indicated by the input configuration identifier, according to the modification rules stored in the modification rule database 203. The specific modification rules are stored in the modification rule database 203 by, for example, setting before factory shipping and/or by firmware updates.

A content acquisition module 204 employs the modified content identifier generated by the identifier modification module 202 to access the server apparatus 300 and receives the data of the video content corresponding to the identifier. The content acquisition module 204 outputs the received data to a replaying processor 205.

The replaying processor 205 replays (decodes) the data of the input video content and outputs the decoded data to a signal processor 206. The signal processor 206 converts the decoded data into a video signal and a display module 207 uses the video signal to display a video.

Explanation follows regarding an example of data configuration in the device database 107 and the modification rule database 203, with reference to FIGS. 3A and 3B.

FIG. 3A is a diagram showing an example of a data configuration of the device database 107. The device database 107 is stored with a device name and identifier (such as IP address) of the device associated with each other for respective one or more devices.

FIG. 3B is a diagram showing an example of a data configuration of the modification rule database 203. The database is stored with one or more modification rules. There are a modification rule 1 and a modification rule 2 stored in the example shown in FIG. 3B. The modification rule 1 includes an identifier 2031 and an identifier 2032 associated with each other. The identifier 2031 has a common identifier 2031a that is a common identifier independent of the content, and a unique identifier 2031b that is an identifier of unique content. Similarly the identifier 2032 includes a common identifier 2032a and a unique identifier 2032b.

When the common identifier 2031a is included in the content identifier transmitted from the mobile terminal 100, based on the modification rule database 203 the identifier modification module 202 replaces the portion in the content identifier corresponding to the common identifier 2031a with the common identifier 2032a. The identifier modification module 202 accordingly generates from the input content identifier content an identifier for content corresponding to the content indicated by the input content identifier but of a different quality.

Similarly the modification rule 2 includes an identifier 2033 and an identifier 2034 associated with each other, with the identifier 2033 including a common identifier 2033a and a unique identifier 2033b, and with the identifier 2034 including a common identifier 2034a and a unique identifier 2034b. When the input content identifier includes the common identifier 2033a, the identifier modification module 202 replaces the portion in the content identifier corresponding to the common identifier 2033a with the common identifier 2034a.

When the input content identifier does not include the common identifier 2031a or the common identifier 2033a but includes the common identifier 2032a or the common identifier 2034a, the identifier modification module 202 outputs the input content identifier to the content acquisition module 204 without modifying the input content identifier to generate a new identifier.

FIGS. 4A to 4D are diagrams showing examples of screen configurations for a screen for display on the mobile terminal 100 according to the first exemplary embodiment. Such screens are generated by the GUI processor 106.

Figure 4A:
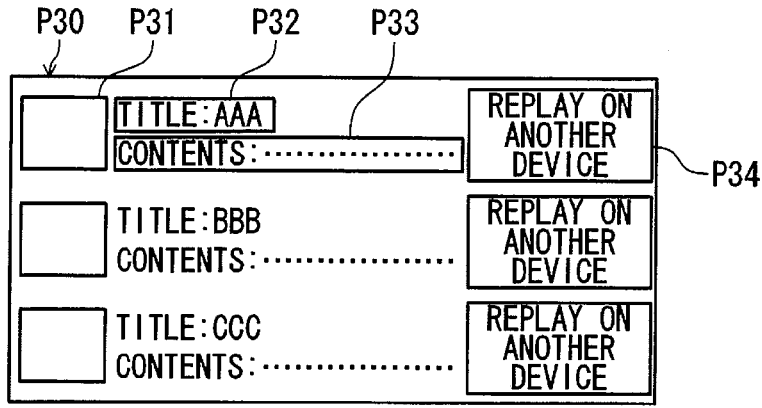
FIGS. 4A to 4D are diagrams showing examples of screens generated and displayed on the mobile terminal according to the first exemplary embodiment.

FIG. 4A shows an example screen of a content selection screen generated by the GUI processor 106. The content selection screen P30 shows for each of the respective content images, such as a content image P31, a title P32, a content description P33, and another-device replaying button P34. The content image P31 is a representative image of the video content, the title P32 is the title of the content, the content description P33 is a descriptive explanation of the content, the other-device replaying button P34 is a button for transmitting the identifier of the content to other-device.

When in receipt of an operational input to the image of one or other of the content image P31, the title P32 or the content description P33, the GUI processor 106 performs processing of the operational input as own-device replaying operation so as to replay the content corresponding to the image on the mobile terminal 100. Namely, the GUI processor 106 outputs the identifier (such as URI) of the content received by operational input to the content acquisition module 101 instructing acquisition of the content corresponding to the identifier, or the GUI processor 106 generates screen data of the replaying screen and outputs the generated screen data to the signal processor 103. On receipt of the content data the content acquisition module 101 then outputs the data to the replaying processor 102.

Figure 4B:
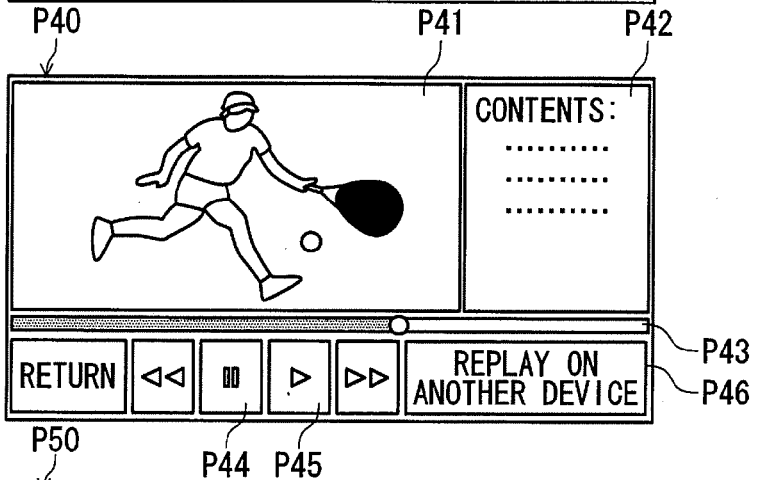
Figure 4C:
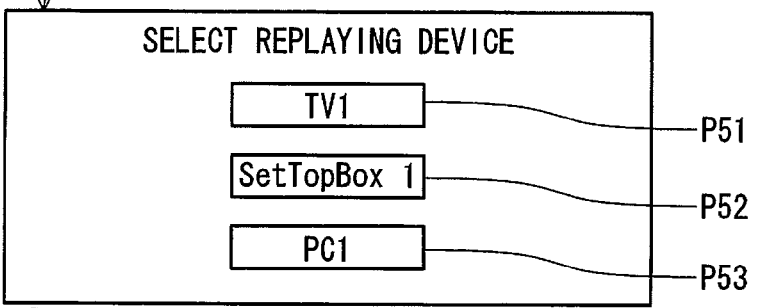

When the operational input acceptor 105 has accepted an operational input to the other-device replaying button P34, the GUI processor 106 displays another-device selection screen as shown in FIG. 4C.

FIG. 4B is a diagram showing an example screen of a replaying screen. A replaying screen P40 here is laid out with a video display region P41, a content description P42, a seek-bar P43, a stop button P44, a replaying button P45 and another-device replaying button P46. The video display region P41 is a region for displaying the video being replayed. The content description P42 is a region for displaying an explanatory description regarding the content. The seek-bar P43 is an image showing the replaying position in the video. The stop button P44 is an image for receiving a stop operational input to stop video replaying, and the replaying button P45 is an image for receiving a replaying operational input for starting video replaying. The other-device replaying button P46 is an image for receiving another-device replaying operational input for replaying the contents being replayed on another device.

When the operational input acceptor 105 has accepted an operational input to the stop button P44 or the replaying button P45, the GUI processor 106 instructs the replaying processor 102 to respectively stop or start replaying the contents. Further, when the operational input acceptor 105 has accepted operational input to the other-device replaying button P46, the GUI processor 106 generates a device selection screen such as the one shown in FIG. 4C.

FIG. 4C shows an example of a screen configuration for a device selection screen. The device selection screen P50 is laid out with device selection buttons P51 to P53. The GUI processor 106 is disposed with a device name for each of the respective buttons, based on the device database 107. When operational input is received by the operational input acceptor 105 to one of the device selection buttons P51 to P53, the GUI processor 106 instructs the transmission controller 108 to transmit the identifier of the content received after selection using the content selection screen P30, or identifier of the content being replayed on the replaying screen P40, to the address of the device selected according to the operational input on the content selection screen P30. The GUI processor 106 then generates data of the operational input screen shown in FIG. 4D.

Figure 4D:
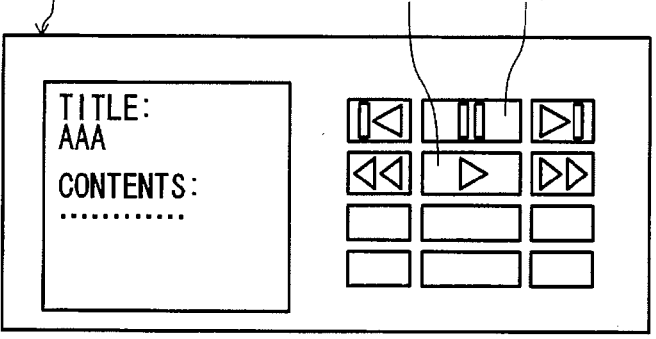

FIG. 4D shows an example of a screen configuration of an operational input screen. The screen P60 is laid out with various buttons such as a replaying button P61 and a stop button P62. When the operational input acceptor 105 has accepted operational input to the replaying button P61 or the stop button P62, the GUI processor 106 generates and transmits a command to the transmission controller 108 instructing stopping or replaying the video content on the device selected on the replaying device selection screen.

Figure 5:
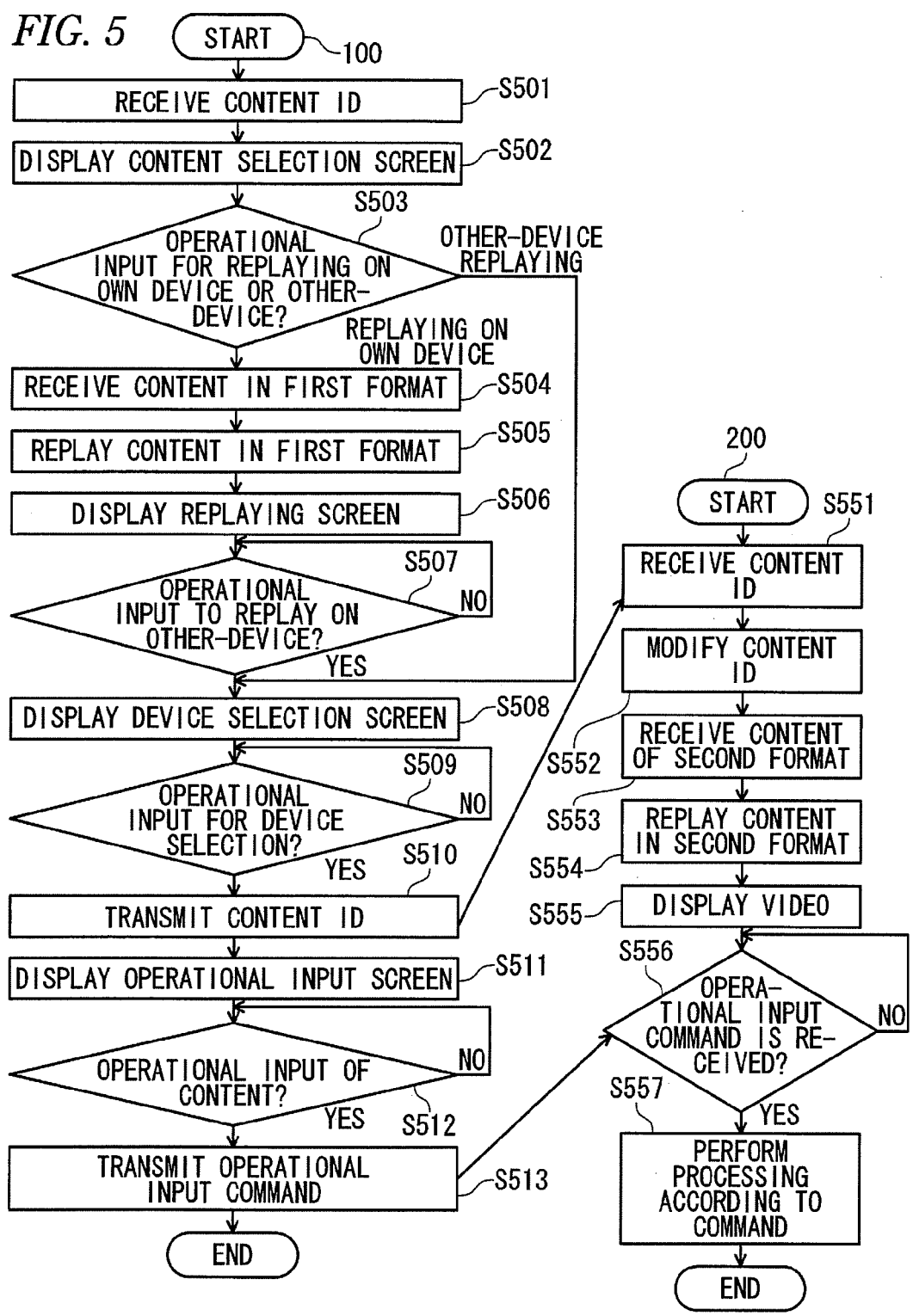
FIG. 5 is a diagram showing an example of flow in processing related to content acquisition by the mobile terminal and the display apparatus according to the first exemplary embodiment.

Explanation follows regarding an example of processing flow related to content acquisition by the mobile terminal 100 and the display apparatus 200, with reference to FIG. 5.

The mobile terminal 100 first receives a video content identifier such as from a video distribution Web page (step S501). The mobile terminal 100 here may, for example, receive the identifier of video content for mobile use of a first format of lower quality (such as with respect to video resolution, audio bitrate, amount of text) than normal video contents. The display module 104 displays a content selection screen such as the one shown in FIG. 4A (step S502). When other-device replaying operational input is received for content out of the various content displayed on the content selection screen (other-device replaying at step S503) then the display module 104 displays an other-device selection screen such as the one shown in FIG. 4C (step S508).

However, at S503, when operational input is received instructing one of the contents to be replayed on the own device (replaying on own-device at step S503) then a content request including the identifier of the content is transmitted to the server apparatus 300, and video content in the first format is received (step S504). The mobile terminal 100 then displays a replaying screen such as the one shown in FIG. 4B (step S505), and replays the data of the video content received (step S506).

When an operational input is received to the other-device replaying button on the replaying screen (Yes at step S507), the mobile terminal 100 displays a device selection screen such as the one shown in FIG. 4C (step S508). Then, when device selection operational input to the device selection screen is received (Yes at step S509), the identifier of the content is transmitted to the address of the device instructed by the operational input (step S510). Then, when the content identifier has been transmitted, the mobile terminal 100 displays an operational input screen such as the one shown in FIG. 4D (step S511). When operational input is received to the screen (Yes at step S512), the mobile terminal 100 transmits a command corresponding to the operational input to the address of the device identified by the operational input at step S509 (step S513).

Explanation follows regarding an example of processing flow in the display apparatus 200.

When the content identifier has been received from the mobile terminal 100 by the receiver 201 (step S551), the identifier modification module 202 determines whether or not specific identifier(s) are included in the identifier. When a specific identifier is included, the identifier modification module 202 generates a content identifier in which the identifier has been replaced according to the modification rule database 203 (step S552). The content acquisition module 204 transmits the modified content identifier to the server apparatus 300, and receives the content in a second format as indicated in the modified identifier (step S553). The content in the second format content that corresponds to the first format content, but, for example, has a higher video resolution than the content in the first format.

The replaying processor 205 generates data for the content received by the content acquisition module 204 (step S554), and the display module 207 displays the replayed video (step S555). When an operational command such as a stop command or replaying command is transmitted from the mobile terminal 100 and input to the receiver 201 (Yes at step S556), the receiver 201 outputs the command to the replaying processor 205, and the replaying processor 205 respectively stops or starts replaying the content data according to the command (step S557).

Configuration may be made such that when content is replayed by the processing of step S504 to step S506 the mobile terminal 100 transmits data indicating the replaying position to the display apparatus 200 when the other-device replaying instruction of step S507 is received. Namely, when the other-device replaying operational input is received, the GUI processor 106 receives data of the replaying position in currently replaying from the replaying processor 102, and outputs this data to the transmission controller 108. The transmission controller 108 then transmits the content identifier and the replaying position data from the transmitter 109 to the display apparatus 200. The display apparatus 200 receives the replaying position data and outputs the replaying position data to the replaying processor 205, the replaying processor 205 then replays the content data of the second format input from the content acquisition module 204, starting from the replaying position according to the replaying position data.

The mobile terminal 100 does not necessarily have to display a device selection screen when another-device operational input is received at step S503 or S507. For example, configuration may be made such that the device for replaying the video content is preset, and content identifier is transmitted to the set device when another-device replaying operational input is received. Explanation of the present exemplary embodiment is of a case in which the server apparatus 300 is provided with content data for plural different qualities, such as with respect to video resolution, audio quality and amount of text, for each single video content, however the server apparatus 300 may be stored with content data of plural different audio content and text content, and Web page content data including such content may also be stored in plural formats such as with respect to audio quality, amount of text, font size. In such cases, the mobile terminal 100 transmits these content identifier(s) to the display apparatus 200, the display apparatus 200 modifies the identifier(s) according to the modification rule database 203, and receives the content using the modified identifier(s).

Second Exemplary Embodiment

Figure 6:
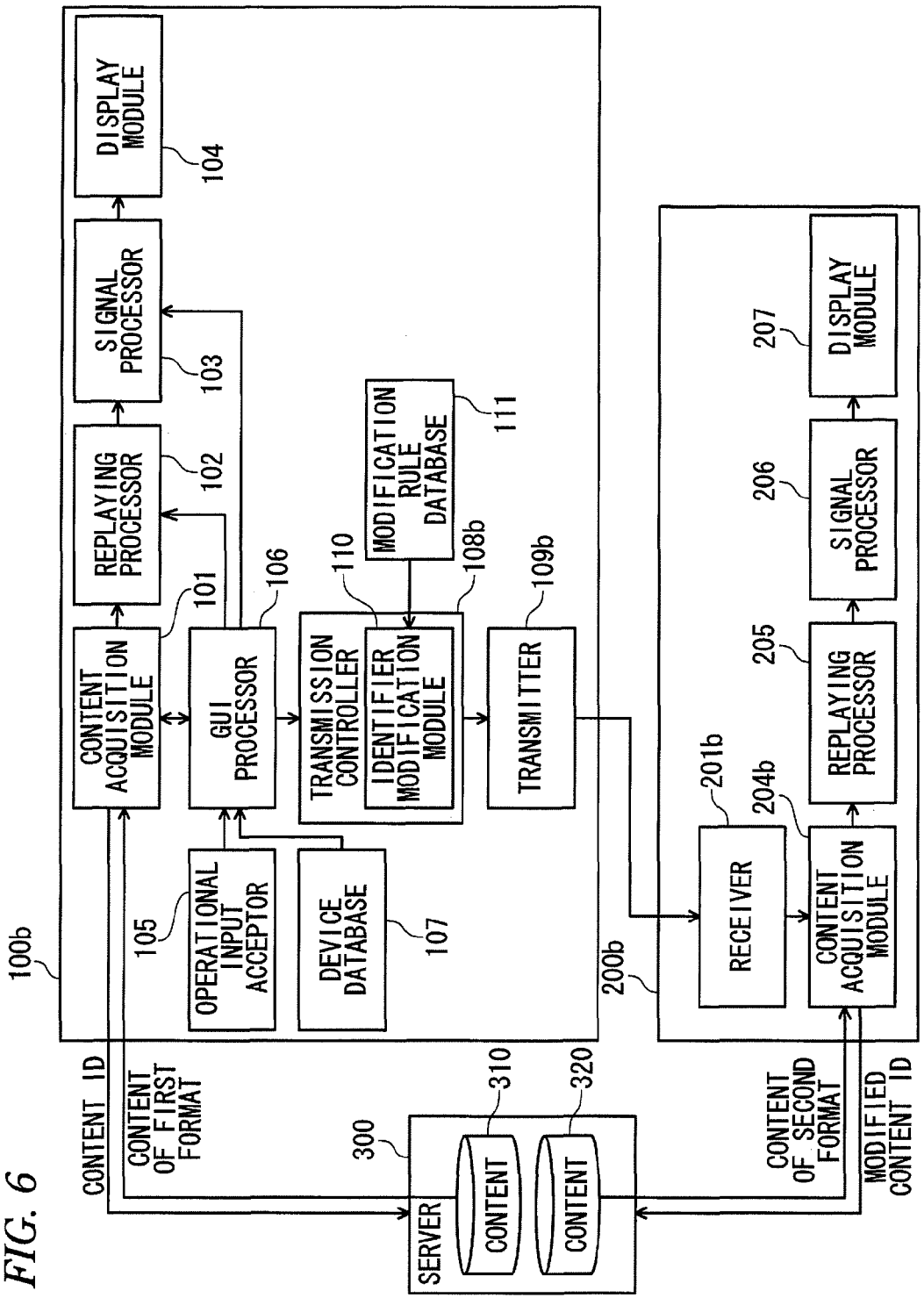
FIG. 6 is an example of a functional block diagram showing a mobile terminal and a display apparatus according to a second exemplary embodiment.
Figure 7:
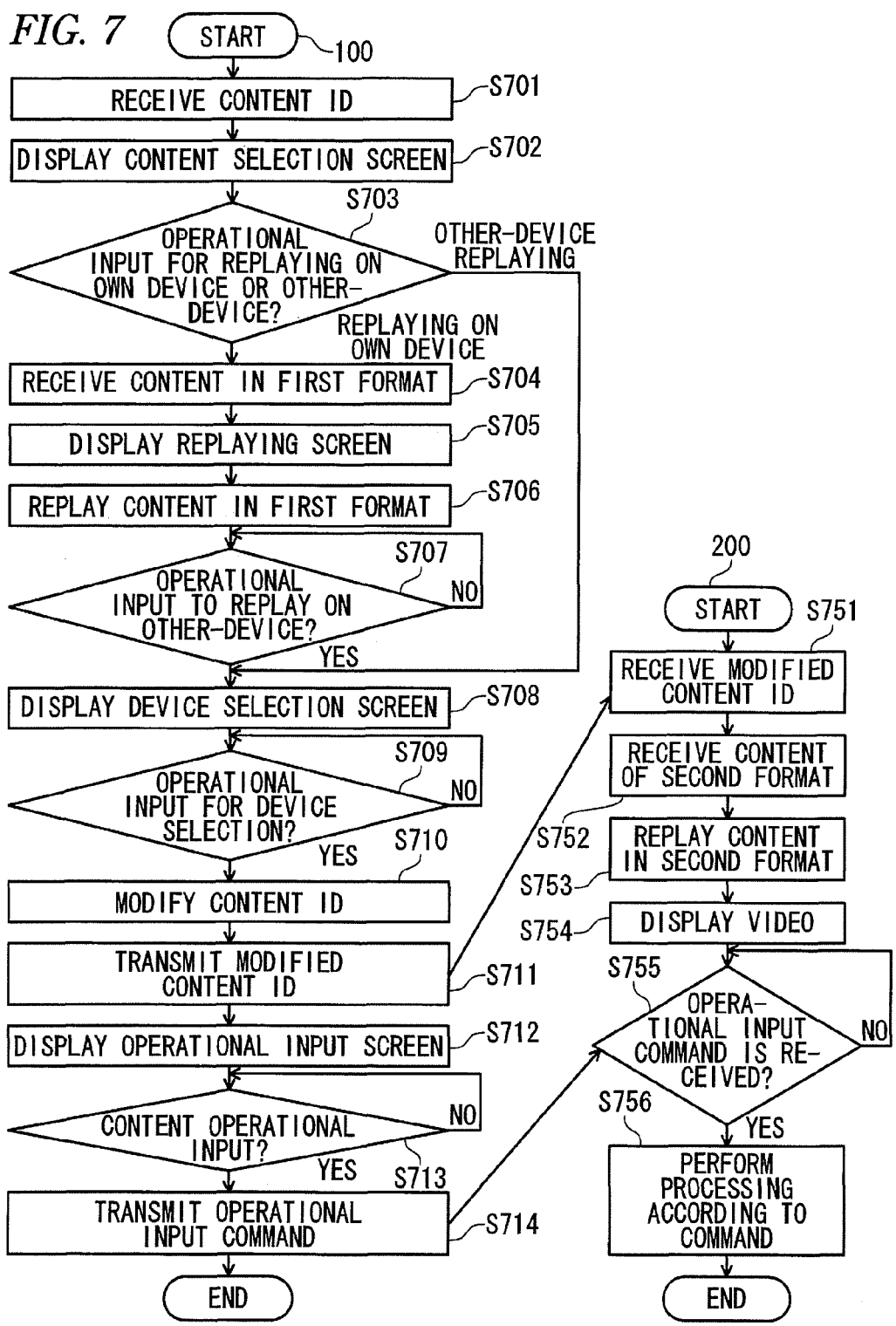
FIG. 7 is a diagram showing an example of flow in processing related to content acquisition by the mobile terminal and the display apparatus according to the second exemplary embodiment.

Explanation follows regarding a second exemplary embodiment, with reference to FIG. 6 and FIG. 7. In the first exemplary embodiment, the content identifier is modified in a display apparatus, however the second exemplary embodiment differs therefrom in that modification is performed in a mobile terminal. A data processing system according to the second exemplary embodiment includes, for example, a mobile terminal 100b, a display apparatus 200b and a server apparatus 300. Since these apparatuses of the second exemplary embodiment have similar functions to the mobile terminal 100, the display apparatus 200 and the server apparatus 300 of the first exemplary embodiment, explanation follows concentrating on functions that differ from the first exemplary embodiment.

FIG. 6 is a diagram showing an example of functional blocks of the mobile terminal 100b and the display apparatus 200b according to the second exemplary embodiment.

The mobile terminal 100b includes a content acquisition module 101, a replaying processor 102, a signal processor 103, a display module 104, an operational input acceptor 105, a GUI processor 106, a device database 107, a transmission controller 108b, a transmitter 109b, an identifier modification module 110, and a modification rule database 111. Modules allocated the same reference numerals as those of the mobile terminal 100 of the first exemplary embodiment have similar functions to the functions explained in the first exemplary embodiment.

The device identifier (such as IP address) from the GUI processor 106 and the content identifier (such as URI) are input to the transmission controller 108b. The transmission controller 108b includes the identifier modification module 110. The identifier modification module 110 has a function corresponding to that of the identifier modification module 202 of the display apparatus 200 in the first exemplary embodiment. Namely, when the content identifier input from the GUI processor 106 includes a specific identifier, the identifier modification module 110 replaces the specific identifier with another identifier according to the modification rule database 111.

The modification rule database 111 has a similar function to that of the device database 107 in the first exemplary embodiment. By performing such replacement, the identifier modification module 110 generates a content identifier of contents corresponding to the contents indicated in the content identifier input from the GUI processor 106, but differing in quality therefrom (such as with respect to at least one of video resolution, audio bitrate and/or text volume).

The transmission controller 108b instructs the transmitter 109b to transmit the generated content identifier to the device indicated in the device identifier (such as IP address) input from the GUI processor 106. The transmitter 109b transmits the modified content identifier as instructed.

Explanation follows regarding an example of functional blocks of the display apparatus 200b. The display apparatus 200b includes a receiver 201b, a content acquisition module 204b, a replaying processor 205, a signal processor 206, and a display module 207.

The receiver 201b receives the modified content identifier transmitted from the mobile terminal 100b. The receiver 201b outputs the content identifier to the content acquisition module 204b. The content acquisition module 204b employs the input content identifier to transmit a content request to the server apparatus 300, and receives data of content transmitted in response to the content request. When input with the content data, the content acquisition module 204b outputs the data to the replaying processor 205. The functions of the replaying processor 205, the signal processor 206 and the display module 207 are similar to those explained in the first exemplary embodiment.

Explanation follows regarding an example of processing flow related to content acquisition by the mobile terminal 100b and the display apparatus 200b, with reference to FIG. 7.

The mobile terminal 100b first receives a video content identifier, such as from a video distribution Web page (step S701). The display module 104 then displays a content selection screen (step S702). The GUI processor 106 performs selection of content for replaying and selection of whether the content is to be replayed on the own device or on another device according to operational input to the content selection screen (step S703). When operational input is received to another-device replaying button for content displayed on the content selection screen ("other-device replaying" at step S703), the display module 104 displays the device selection screen (step S708).

However, when at S703 operational input is received instructing replaying of one of the content items on the own device ("replaying on own device" at step S703), the content acquisition module 101 transmits a content request including the content identifier to the server apparatus 300, and, for example, receives video content in a first format designed for mobile devices (step S704). The mobile terminal 100 then displays the replaying screen (step S705), and replays and displays the data of the received video content (step S706).

When operational input to the other-device replaying button on the replaying screen is received (Yes at step S707), the mobile terminal 100b displays a device selection screen (step S708). When a device selection operational input to the device selection screen is received (Yes at step S709), the identifier modification module 110 determines whether or not a specific identifier is included in the identifier of the content selected at step S703. When determined that a specific identifier is included, the identifier modification module 110 generates a content identifier in which the specific identifier is replaced with an identifier according to the modification rule database 111 (step S710).

Then the transmitter 109b transmits the content identifier to the address of the device selected according to the operational input received at step S709 (step S711). When the content identifier has been transmitted, the mobile terminal 100b displays an operational input screen (step S712). When operational input to the screen is received (Yes at step S713), a command in accordance with the operational input is transmitted to the address of the device indicated by the operational input at step S709 (step S714).

Explanation follows regarding an example of processing flow in the display apparatus 200b.

When the receiver 201b receives a modified content identifier transmitted from the mobile terminal 100b (step S751), the content acquisition module 204b transmits the modified content identifier to the server apparatus 300, and receives content of a second format as indicated in the identifier (step S752). The replaying processor 205 generates data for the content received by the content acquisition module 204b (step S753) and displays the replayed video on the display module 207 (step S754). When the receiver 201b has received input of an operational command, such as a stop command or replaying command, transmitted from the mobile terminal 100b (Yes at step S755), the receiver 201b outputs the command to the replaying processor 205, and the replaying processor 205 stops or starts replaying of the content data according to the command (step S756).

Third Exemplary Embodiment

Figure 8:
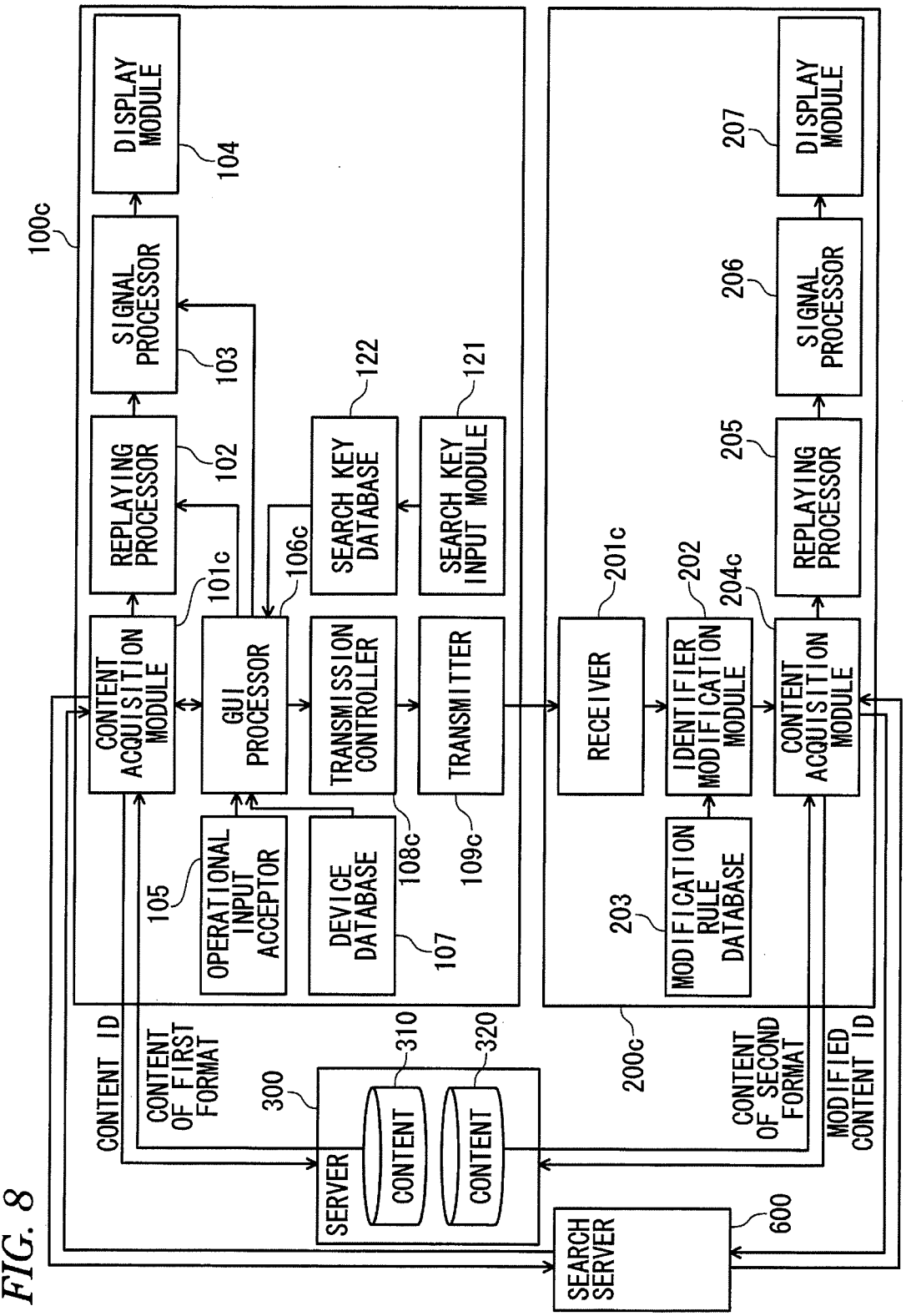
FIG. 8 is an example of a functional block diagram showing a mobile terminal and a display apparatus according to a third exemplary embodiment.
Figure 9:
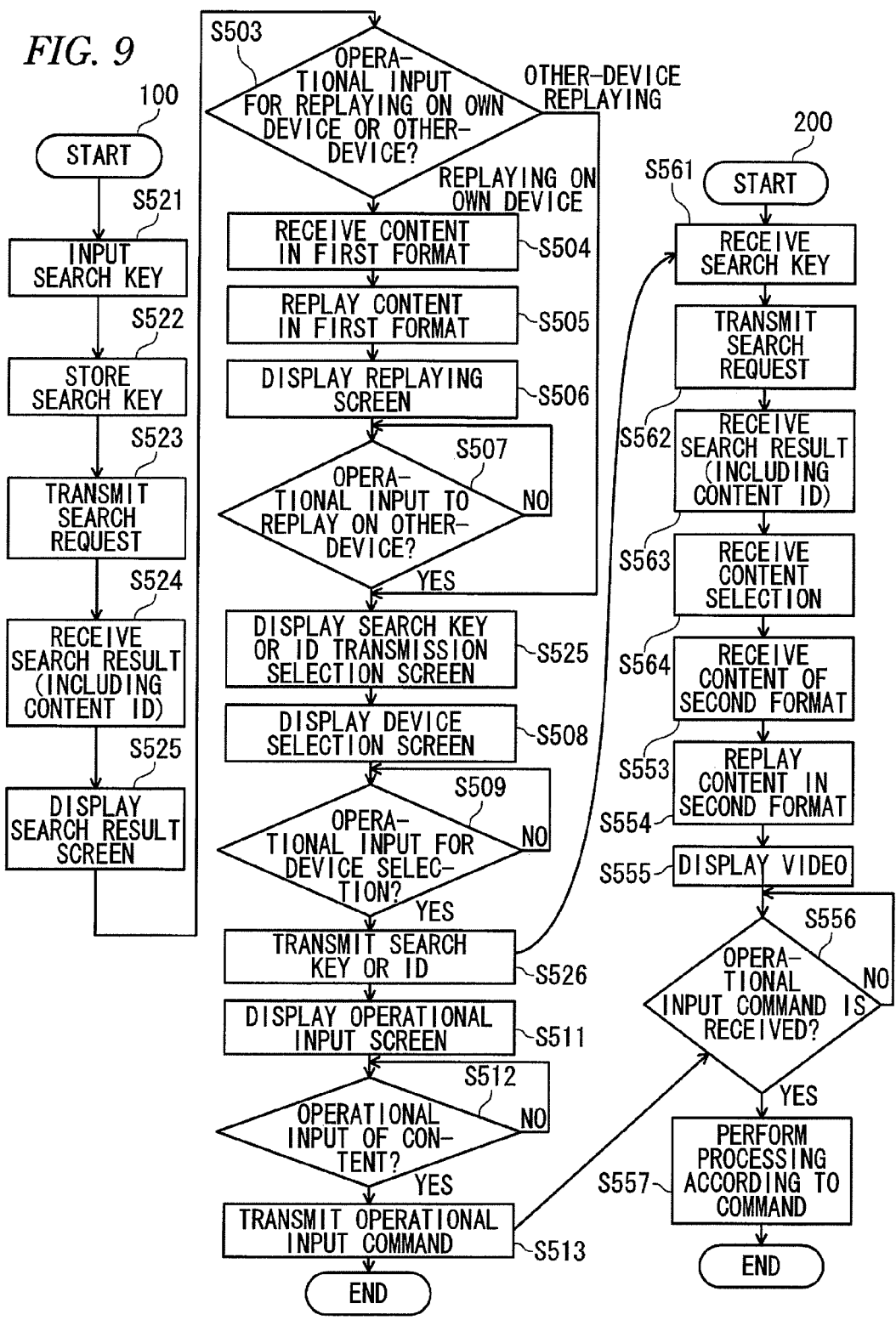
FIG. 9 is a diagram showing an example of flow in processing related to content acquisition by the mobile terminal and the display apparatus according to the third exemplary embodiment.

Explanation follows regarding a third exemplary embodiment, with reference to FIG. 8 and FIG. 9. In the first and the second exemplary embodiments, a content identifier is transmitted from a mobile terminal to a display apparatus, and the display apparatus receives content from a server apparatus, however the third exemplary embodiment differs therefrom in that a search key is transmitted from a mobile terminal to a display apparatus. Namely, a search key is employed in the display apparatus to search for content, and content suitable for the display apparatus is received by specifying and displaying a content identifier included in the search result.

The data processing system according to the third exemplary embodiment includes, for example, a mobile terminal 100c, a display device 200c, a server apparatus 300 and a search server apparatus 600. The apparatuses of the third exemplary embodiment have functions similarly to the mobile terminal 100, the display apparatus 200 and the server apparatus 300 of the first exemplary embodiment, and so explanation will concentrate on functionality that differs from the first exemplary embodiment.

FIG. 8 is a diagram displaying an example of functional blocks of the mobile terminal 100c and the display device 200c according to the third exemplary embodiment.

The mobile terminal 100c includes a content acquisition module 101c, a replaying processor 102, a signal processor 103, a display module 104, an operational input acceptor 105c, a GUI processor 106c, a transmission controller 108c, a transmitter 109c, a search key input module 121 and a search key database 122. Modules having the same reference numerals to those of the mobile terminal 100 of the first exemplary embodiment have similar functions to the functions explained in the first exemplary embodiment.

The search key input module 121 is input with a character string (called a search key) such as, for example, "today's weather". Configuration may be made such that input to the search key input module 121 is by a user performing a character string input operation, or by inputting data for a character string from an external apparatus. The search key database 122 then stores the input search key.

The content acquisition module 101c transmits a search key to the search server apparatus 600 over the Internet, and receives search result(s) including identifiers of any content showing a certain degree of likeness to the search key. The search results include, for example, content identifiers of video content or Web page content for which content data is stored on the server apparatus 300.

The GUI processor 106c generates a screen showing the search results (for example a content selection screen like that shown in FIG. 4A) and displays the screen on the display module 104. When the operational input acceptor 105c has accepted an operational input of a search key transmission request to the search result screen, the GUI processor 106c extracts the search key employed in the search from the search key database 122 and outputs the search key to the transmission controller 108c. The transmitter 109c transmits the search key to the display device 200c.

Explanation follows regarding the operational input of the search key transmission request. For example, when operational input to the other-device replaying button P34 has been received on the content selection screen of FIG. 4A, the GUI processor 106c displays a screen for selecting whether to send one out of the content identifier or the search key employed in content search corresponding to the other-device replaying button P34 to another device. Then, for example, an operational input to the screen to transmit the search key to other-device becomes an operational input of a search key transmission request. When the operational input of the search key transmission request is received, the transmitter 109c transmits the search key that was employed in searching the content selected on the content selection screen to the display device 200c.

In other words, the GUI processor 106c displays a button for executing processing for transmitting the selection designated content to the other-device, and an image for executing processing for transmitting the search key that was employed in the search for the selection designated content, and is capable of switching between two types of processing according to the operational input to these images.

The transmission controller 108c of the mobile terminal 100c may be configured so as to include the identifier modification module 110 explained in the second exemplary embodiment. Namely, the GUI processor 106c may be configured such that, when an operational input is received to the button for executing processing for transmitting the identifier of the selection designated content to the other-device, the transmission controller 108c modifies the identifier of the content, and transmits the modified content identifier to the display device 200c. In other words, the GUI processor 106c may be configured to display a button for executing processing for modifying and transmitting the identifier of the selection designated content to the other-device, and an image for executing processing for transmitting the search key that was employed in the search for the selection designated content, switch between two types of processing according to the operational input to these images.

Explanation follows regarding an example of functional blocks of the display device 200c. The display device 200c includes a receiver 201c, a content acquisition module 204c, a replaying processor 205, a signal processor 206 and a display module 207.

The receiver 201c receives the search key. The content acquisition module 204c transmits the search key to the search server apparatus 600 and receives search results. The search results, for example, include the content ID of video content and/or Web page content. When a user designates content included in the search result, the content identifier is transmitted to the server apparatus 300 and content is received.

Explanation follows regarding an example of processing flow related to content acquisition by the mobile terminal 100c and the display device 200c, with reference to FIG. 9. Portions in the flow allocated step numbers that are the same as the step numbers of the first exemplary embodiment are portions that execute processing corresponding to the processing described above.

The mobile terminal 100c is first input with a search key (step S521), and stores the search key (step S522). The mobile terminal 100c then transmits a search request including the search key to the search server apparatus 600 (step S523), and receives search results including data (including content identifiers) of contents related to the search key (step S524). Since the server apparatus 300 has redirect function, the content identifier received here is, for example, a content identifier shown by 2031 and 2033 in FIG. 3, capable of acquiring content suitable for mobile devices. The mobile terminal 100c displays the search results in a display format such as a content selection screen like that shown in FIG. 4A (step S525). The subsequent processing from steps S503 to S507 is similar to the processing of the first exemplary embodiment. The mobile terminal 100c displays a screen for selecting either to transmit the search key or transmit the content ID, and which of the search key or the content ID is selected for transmission is determined according to user operational input to the screen. After executing the processing of steps S508 and S509, the mobile terminal 100c then transmits the search key or the content identifier to the display device 200c (step S526). Configuration may be made such that, when the mobile terminal 100c transmits the content identifier, the content identifier is transmitted to the display device 200c after modification as explained with respect to FIG. 3. Subsequent processing flow is similar to that from step S511 onward in FIG. 5.

On receipt of a search key (step S561), the display device 200c transmits a search request including the search key to the search server apparatus 600 (step S562). When the content acquisition module 204c has received a search result including content data (including content ID) (step S563), the display device 200c displays the search result on the display module 207. The server apparatus 300 has redirect function, however there is no redirection to a mobile site version in response to the search request from the display device 200c and so the content identifier received using the search result is a content identifier, such as that shown by 2032 and 2034 in FIG. 3, capable of acquiring content suitable for a display apparatus. When operational input for specifying content included in the search result is received (step S564), transmitting the content ID of the selection designated content to the server apparatus 300 enables content with the content ID to be received (step S553). Subsequent processing flow is similar to that of steps S554 to S557 in FIG. 5.

While certain exemplary embodiment has been described, the exemplary embodiment has been presented by way of example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A content receiving apparatus comprising:
a first receiver configured to receive a first identifier of a first content and a replaying position data regarding a replaying position of the first content from a first external apparatus, the first identifier used for accessing the first content;
a modification rule database stored with one or more modification rules;
a transmission controller configured to generate a second identifier of a second content by changing a portion of the first identifier based on one or more modification rules within the modification rule database if the first identifier includes a specific identifier, the second content corresponding to the first content and a quality of the second content being different from a quality of the first content;
a transmitter configured to transmit a content request by using the second identifier to a second external apparatus different from the first external apparatus;
a second receiver configured to receive data of the second content transmitted from the second external apparatus in response to the content request; and
a processor configured to replay the second content, wherein if the first identifier does not include the specific identifier, the transmission controller is configured not to generate the second identifier based on the one or more modification rules, the transmitter is configured to transmit the content requested by using the first identifier, and the second receiver is configured to receive the first content,
wherein the processor is configured to replay the first content from a first replaying position indicated by the replaying position data, and
wherein the processor is configured to replay the second content from a second replaying position determined by using the replaying position data.

2. The content receiving apparatus of claim 1, wherein the second content comprises a different video resolution level than the first content so that the second content has the different quality from the first content.

3. The content receiving apparatus of claim 1, wherein the second content comprises a different audio bitrate than the first content so that the second content has the different quality from the first content.

4. A data processing apparatus comprising:
a first processor configured to select a first content in content data stored on a first external apparatus;
a modification rule database stored with one or more modification rules;
a transmission controller configured to generate a second identifier of second content by replacing a portion of the first identifier according to one or more modification rules of the modification rule database if the first identifier includes a specific identifier, the second content corresponding to the first content and a quality of the second content being different than a quality of the first content;
an identifier transmitter configured to transmit the second identifier to a second external apparatus different from the first external apparatus; and
a second processor configured to replay a content transmitted from the second external apparatus, wherein
if the first identifier does not include the specific identifier the transmission controller is configured not to generate the second identifier based on the one or more modification rules, the transmitter is configured to transmit the content request by using the first identifier, and the second receiver is configured to receive the first content,
wherein the second processor is configured to replay the first content from a first replaying position indicated by the replaying position data, and
wherein the second processor is configured to replay the second content from a second replaying position determined by using the replaying position data.

5. A content receiving apparatus comprising:
a first receiver configured to receive a first identifier of first content and a replaying position data regarding a replaying position of the first content from a first external apparatus, the first identifier used for accessing the first content;
a modification rule database that comprises one or more modification rules;
a transmission controller configured to generate a second identifier of second content by changing a portion of the first identifier according to one or more modification rules of the modification rule database if the first identifier includes a specific identifier, the second content corresponds to the first content and differing in quality from the first content;
a transmitter configured to transmit a content request by using the second identifier to a second external apparatus different from the first external apparatus;
a second receiver configured to receive data of the second content transmitted from the second external apparatus in response to the content request; and
a processor configured to replay the second content, wherein if the first identifier does not include the specific identifier, the transmission controller is configured not to generate the second identifier according to the one or more modification rules, the transmitter is configured to transmit the content requested by using the first identifier, and the second receiver is configured to receive the first content, wherein the processor is configured to replay the first content from a first replaying position indicated by the replaying position data, and wherein the processor is configured to replay the second content from a second replaying position determined by using the replaying position data.

6. The content receiving apparatus of claim 5, wherein the second content comprises a different video resolution level than the first content so that the second content has the different quality from the first content.

7. The content receiving apparatus of claim 5, wherein the second content comprises a different audio bitrate than the first content so that the second content has the different quality from the first content.

* * * * *